(12) United States Patent
Dolle et al.

(10) Patent No.: US 6,881,801 B2
(45) Date of Patent: Apr. 19, 2005

(54) METHOD FOR FEEDING CATALYSTS

(75) Inventors: Volker Dolle, Bensheim (DE); Eduardo Enrique Chicote, Bayreuth (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 10/468,984

(22) PCT Filed: Feb. 28, 2002

(86) PCT No.: PCT/EP02/02159

§ 371 (c)(1), (2), (4) Date: Aug. 25, 2003

(87) PCT Pub. No.: WO02/070568

PCT Pub. Date: Sep. 12, 2002

(65) Prior Publication Data

US 2004/0082738 A1 Apr. 29, 2004

(30) Foreign Application Priority Data

May 3, 2001 (DE) .......................... 101 10 551

(51) Int. Cl.$^7$ ............................................... C08F 4/642
(52) U.S. Cl. ...................... 526/136; 526/128; 526/905; 526/907; 526/916
(58) Field of Search ................................ 526/128, 136, 526/907, 919, 905

(56) References Cited

U.S. PATENT DOCUMENTS

| 3,779,712 A | 12/1973 | Calvert et al. ................. 23/288 |
| 3,827,830 A | 8/1974 | Van Horn .................... 417/225 |
| 3,876,602 A | 4/1975 | Calvert et al. .............. 260/94.9 |
| 4,123,601 A | 10/1978 | Kellum et al. ................. 526/79 |
| 4,188,132 A | 2/1980 | Lenart et al. ................ 366/314 |
| 4,330,645 A | 5/1982 | Juza et al. ..................... 526/61 |
| 4,384,788 A | 5/1983 | Lenart et al. ................ 366/314 |
| 4,690,804 A | 9/1987 | Rohlfing ...................... 422/219 |
| 4,857,613 A | 8/1989 | Zolk et al. ................... 526/128 |
| 5,179,180 A * | 1/1993 | Ahvenainen et al. ..... 526/124.9 |
| 5,288,824 A | 2/1994 | Kerth et al. ................. 526/128 |
| 6,184,170 B1 | 2/2001 | Chang ......................... 502/118 |

FOREIGN PATENT DOCUMENTS

| DE | 2257669 | 6/1973 |
| DE | 2264412 | 7/1973 |
| DE | 19529240 | 2/1997 |
| EP | 0000512 | 1/1981 |
| EP | 0025137 | 3/1981 |
| EP | 0086473 | 8/1983 |
| EP | 0031417 | 10/1983 |
| EP | 0038478 | 10/1983 |
| EP | 0171200 | 2/1986 |
| EP | 0045977 | 1/1987 |
| EP | 0045975 | 4/1989 |
| EP | 0783007 | 7/1997 |
| GB | 2111066 | 6/1983 |

* cited by examiner

Primary Examiner—Fred Teskin
(74) Attorney, Agent, or Firm—Connolly Bove Lodge & Hutz LLP

(57) ABSTRACT

In a method of adding catalysts for the polymerization of $C_2$–$C_{20}$-olefins, the catalyst is firstly introduced into a container A and the cocatalysts used are subsequently mixed with an inert solvent in a container B, and the contents of the container B are introduced into the container A and mixed with the catalyst there and the mixture is introduced from there into the actual polymerization reactor.

5 Claims, No Drawings

METHOD FOR FEEDING CATALYSTS

The present invention relates to a method of adding catalysts for the polymerization of $C_2$–$C_{20}$-olefins, wherein the catalyst is firstly introduced into a container A and the cocatalysts used are subsequently mixed with an inert solvent in a container B, and the contents of the container B are introduced into the container A and mixed with the catalyst there and the mixture is introduced from there into the actual polymerization reactor.

Polymers of $C_2$–$C_{20}$-olefins can be prepared either by liquid-phase polymerization or by polymerization in the monomer (bulk polymerization), in a slurry or by gas-phase polymerization. Since the solid polymer formed can easily be separated from the gaseous reaction mixture, polymerization is increasingly being carried out from the gas phase. The polymerization is carried out with the aid of a Ziegler-Natta catalyst system which customarily comprises a titanium-containing solid component, an organic aluminum compound and an organic silane compound (EP-B 45 977, EP-A 171 200, U.S. Pat. No. 4,857,613, U.S. Pat. No. 5,288,824). However, polymers of $C_2$–$C_{20}$-olefins can also be obtained by polymerization in the presence of metallocene compounds or of polymerization-active metal complexes. In both cases, it is important to introduce the catalyst used into the polymerization reactor in an efficient manner.

Many known techniques for adding finely divided catalysts for the preparation of polymers of $C_2$–$C_{20}$-olefins have been established for decades (EP-A 025 137, DE-A 2 257 669, U.S. Pat. No. 3,827,830, U.S. Pat. No. 4,123,601, U.S. Pat. No. 4,690,804). Customary techniques for the addition of catalysts are based predominantly on a positioning apparatus which delivers a particular volume element into the polymerization reactor via an appropriate transport device.

With the development of ever more effective and more selective catalysts for the polymerization of $C_2$–$C_{20}$-olefins, it is becoming increasingly necessary to introduce catalysts into the polymerization reactor in a reliable and trouble-free manner. Furthermore, economic reasons are making it ever more important to introduce such catalysts into the polymerization reactor in such a way that they can display their maximum productivity there.

It is an object of the present invention to remedy the abovementioned disadvantages and to develop a new method of adding catalysts for the polymerization of $C_2$–$C_{20}$-olefins, by means of which the catalysts can be introduced very reliably and homogeneously into the polymerization reactor. In addition, it is important that the method has a positive influence on the productivity of the catalysts.

We have found that this object is achieved by a novel, significantly improved method of adding catalysts for the polymerization of $C_2$–$C_{20}$-olefins, wherein the catalyst is firstly introduced into a container A and the cocatalysts used are subsequently mixed with an inert solvent in a container B, and the contents of the container B are introduced into the container A and mixed with the catalyst there and the mixture is introduced from there into the actual polymerization reactor.

The method of the present invention is especially suitable for the addition of catalysts in the polymerization of $C_2$–$C_{20}$-olefins.

$C_2$–$C_{20}$-olefins which can be polymerized with the aid of the method of the present invention are, in particular, $C_2$–$C_{20}$-alk-1-enes such as ethylene, propylene, 1-butene, 1-pentene, 1-hexene, 1-heptene or 1-octene, with preference being given to using ethylene, propylene or 1-butene. The term $C_2$–$C_{20}$-olefins as used for the purposes of the present invention also encompasses, in particular, internal $C_4$–$C_{20}$-olefins such as 2-butene or isoprene, $C_4$–$C_{20}$-dienes such as 1,4-butadiene, 1,5-hexadiene, 1,9-decadiene, 5-ethylidene-2-norbornene, 5-methylidene-2-norbornene, also cyclic olefins such as norbornene or α-pinene, trienes such as 1,6-diphenyl-1,3,5-hexatriene, 1,6-di-tert-butyl-1,3,5-hexatriene, 1,5,9-cyclododecatriene or trans,trans-farnesol and also polyunsaturated fatty acids or fatty acid esters. The method can be employed in the preparation of homopolymers of $C_2$–$C_{20}$-olefins or of copolymers of $C_2$–$C_{20}$-olefins, preferably with up to 30% by weight of other copolymerized olefins having up to 20 carbon atoms. For the purposes of the present invention, copolymers include both random copolymers and block or high-impact copolymers.

In general, the novel method of adding catalysts is employed in a polymerization carried out in at least one reaction zone, frequently also in two or more reaction zones, i.e. the polymerization conditions differ between the reaction zones to such an extent that the polymers having different properties are produced. In the case of homopolymers or random copolymers, this can be, for example, the molar mass, i.e. polymers having different molar masses are produced in the various reaction zones to broaden the molar mass distribution. Preference is given to polymerizing different monomers or monomer compositions in the various reaction zones. This then usually leads to the block or high-impact copolymers.

The method of the present invention is particularly useful in the preparation of homopolymers of propylene or of copolymers of propylene with up to 30% by weight of other copolymerized olefins having up to 10 carbon atoms. The copolymers of propylene are random copolymers or block or high-impact copolymers. If the copolymers of propylene have a random structure, they generally contain up to 15% by weight, preferably up to 6% by weight, of other olefins having up to 10 carbon atoms, in particular ethylene, 1-butene or a mixture of ethylene and 1-butene.

The block or high-impact copolymers of propylene are polymers produced by a process in which a propylene homopolymer or a random copolymer of propylene with up to 15% by weight, preferably up to 6% by weight, of other olefins having up to 10 carbon atoms is prepared in the first stage and a propylene-ethylene copolymer which has an ethylene content of from 15 to 99% by weight, and may further comprise other $C_4$–$C_{10}$-olefins is then polymerized onto the homopolymer or random copolymer in the second stage. In general, the amount of propylene-ethylene copolymer polymerized on is such that the copolymer produced in the second stage makes up from 3 to 90% by weight of the end product.

As catalysts which are introduced into the polymerization reactor using the method of the present invention, it is possible to use, inter alia, Ziegler catalysts. The polymerization can also, for example, be carried out by means of a Ziegler-Natta catalyst system. Use is made, in particular, of catalyst systems which comprise a titanium-containing solid component a) together with cocatalysts in the form of organic aluminum compounds b) and electron donor compounds c).

However, the method of the present invention can also be applied to catalyst systems based on metallocene compounds or polymerization-active metal complexes.

To prepare the titanium-containing solid component a), titanium compounds used are generally the halides or alkoxides of trivalent or tetravalent titanium, with titanium alkoxide halide compounds or mixtures of various titanium compounds also being possible. Preference is given to using titanium compounds containing chlorine as halogen. Preference is likewise given to titanium halides containing only titanium and halogen, especially titanium chlorides and in particular titanium tetrachloride.

The titanium-containing solid component a) preferably comprises at least one halogen-containing magnesium compound. In this context, halogen is chlorine, bromine, iodine or fluorine, with bromine being preferred and chlorine being particularly preferred. The halogen-containing magnesium compounds are either used directly in the preparation of the titanium-containing solid component a) or are formed in its preparation. Magnesium compounds suitable for preparing the titanium-containing solid component a) are, in particular, magnesium halides, in particular magnesium dichloride or magnesium dibromide, or magnesium compounds from which the halides can be obtained in a customary manner, e.g. by reaction with halogenating agents, for example magnesium alkyls, magnesium aryls, magnesium alkoxide or magnesium aryl oxide compounds or Grignard compounds. Preferred examples of halogen-free compounds of magnesium which are suitable for the preparation of the titanium-containing solid component a) are n-butylethylmagnesium or n-butyloctylmagnesium. Preferred halogenating agents are chlorine and hydrogen chloride. However, the titanium halides can also serve as halogenating agents.

In addition, the titanium-containing solid component a) advantageously further comprises electron donor compounds, for example monofunctional or polyfunctional carboxylic acids, carboxylic anhydrides or carboxylic esters, or else ketones, ethers, alcohols, lactones or organophosphorus or organosilicon compounds.

As electron donor compounds within the titanium-containing solid component, preference is given to using carboxylic acid derivatives and in particular phthalic acid derivatives of the formula (II)

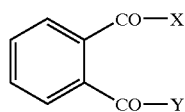
(II)

where X and Y are each a chlorine or bromine atom or a $C_1$–$C_{10}$-alkoxy radical or are together oxygen in an anhydride function. Particularly preferred electron donor compounds are phthalic esters in which X and Y are a $C_1$–$C_8$-alkoxy radical. Examples of preferred phthalic esters are diethyl phthalate, di-n-butyl phthalate, diisobutyl phthalate, di-n-pentyl phthalate, di-n-hexyl phthalate, di-n-heptyl phthalate, di-n-octyl phthalate and di-2-ethylhexyl phthalate.

Further preferred electron donor compounds within the titanium-containing solid component are diesters of 3- or 4-membered, substituted or unsubstituted cycloalkyl-1,2-dicarboxylic acids, and also monoesters of substituted benzophenone-2-carboxylic acids or substituted benzophenone-2-carboxylic acids. As hydroxy compounds employed for preparing these esters, use is made of the alkanols customary in esterification reactions, for example $C_1$–$C_{15}$-alkanols or $C_5$–$C_7$-cycloalkanols which may in turn bear one or more $C_1$–$C_{10}$-alkyl groups, and $C_6$–$C_{10}$-phenols.

It is also possible to use mixtures of various electron donor compounds.

In the preparation of the titanium-containing solid component a), use is generally made of from 0.05 to 2.0 mol, preferably from 0.2 to 1.0 mol, of the electron donor compounds per mol of the magnesium compound.

Furthermore, the titanium-containing solid component a) can further comprise inorganic oxides as supports. The support used is generally a finely divided inorganic oxide which has a mean particle diameter of from 5 to 200 μm, preferably from 20 to 70 μm. For the purposes of the present invention, the mean particle diameter is the volume-based mean (median) of the particle size distribution determined by Coulter Counter analysis.

The particles of the finely divided inorganic oxide are preferably composed of primary particles which have a mean particle diameter of from 1 to 20 μm, in particular from 1 to 5 μm. The primary particles are porous, granular oxide particles which are generally obtained by milling a hydrogel of the inorganic oxide. It is also possible to sieve the primary particles before they are processed further.

Furthermore, the inorganic oxide to be used preferably also has voids or channels which have a mean diameter of from 0.1 to 20 μm, in particular from 1 to 15 μm, and whose macroscopic proportion by volume in the total particle is in the range from 5 to 30%, in particular in the range from 10 to 30%.

The mean particle diameter of the primary particles and the macroscopic proportion by volume of the voids and channels in the inorganic oxide are advantageously determined by image analysis with the aid of scanning electron microscopy or electron probe microanalysis, in each case on particle surfaces and particle cross sections of the inorganic oxide. The photomicrographs obtained are evaluated and the mean particle diameter of the primary particles and the macroscopic proportion by volume of the voids and channels are determined therefrom. Image analysis is usually carried out by converting the electron-microscopic data material into a halftone binary image and digital evaluation by means of a suitable EDP program, e.g. the software package Analysis from SIS.

A preferred inorganic oxide can be obtained, for example, by spray drying the milled hydrogel which is for this purpose mixed with water or an aliphatic alcohol. Such finely divided inorganic oxides are also commercially available.

The finely divided inorganic oxide usually also has a pore volume of from 0.1 to 10 $cm^3/g$, preferably from 1.0 to 4.0 $cm^3/g$, and a specific surface area of from 10 to 1000 $m^2/g$, preferably from 100 to 500 $m^2/g$, with the values quoted here being those determined by mercury porosimetry in accordance with DIN 66133 and by nitrogen adsorption in accordance with DIN 66131.

It is also possible to use an inorganic oxide whose pH, i.e. the negative logarithm to the base ten of the proton concentration, is in the range from 1 to 6.5, in particular in the range from 2 to 6.

Suitable inorganic oxides are, in particular, the oxides of silicon, of aluminum, of titanium or of one of the metals of main groups I and II of the Periodic Table. Particularly preferred oxides are aluminum oxide, magnesium oxide and sheet silicates and also silicon oxide (silica gel). It is also possible to use mixed oxides such as aluminum silicates or magnesium silicates.

The inorganic oxides used as support have water present on their surface. Part of this water is physically bound by adsorption and part of it is chemically bound in the form of hydroxyl groups. The water content of the inorganic oxide can be reduced or eliminated entirely by thermal or chemical treatment. In the case of a chemical treatment, use is generally made of customary desiccants such as $SiCl_4$, chlorosilanes or aluminum alkyls. The water content of suitable inorganic oxides is from 0 to 6% by weight. An inorganic oxide is preferably used in the form in which it is commercially available, without further treatment.

The magnesium compound and the inorganic oxide are preferably present in the titanium-containing solid component a) in such amounts that from 0.1 to 1.0 mol, in particular from 0.2 to 0.5 mol, of the compound of magnesium is present per mol of the inorganic oxide.

In the preparation of the titanium-containing solid component a), use is generally also made of $C_1$–$C_8$-alkanols such as methanol, ethanol, n-propanol, isopropanol, n-butanol, sec-butanol, tert-butanol, isobutanol, n-hexanol, n-heptanol, n-octanol or 2-ethylhexanol or mixtures thereof. Preference is given to using ethanol.

The titanium-containing solid component can be prepared by methods known per se. Examples are described in, for example, EP-A 45 975, EP-A 45 977, EP-A 86 473, EP-A 171 200, GB-A 2 111 066, U.S. Pat. No. 4,857,613 and U.S. Pat. No. 5,288,824. The process known from DE-A 195 29 240 is preferably employed.

Aluminum compounds b) suitable as cocatalysts include trialkylaluminum and also compounds of this type in which an alkyl group is replaced by an alkoxy group or by a halogen atom, for example by chlorine or bromine. The alkyl groups can be identical or different. Linear or branched alkyl groups are possible. Preference is given to using trialkylaluminum compounds whose alkyl groups have from 1 to 8 carbon atoms, for example trimethylaluminum, triethylaluminum, triisobutylaluminum, trioctylaluminum or methyldiethylaluminum or mixtures thereof.

In addition to the aluminum compound b), use is generally made of electron donor compounds c) such as monofunctional or polyfunctional carboxylic acids, carboxylic anhydrides or carboxylic esters, or else ketones, ethers, alcohols, lactones, or organophosphorus or organosilicon compounds as further cocatalysts, with the electron donor compounds c) being able to be identical to or different from the electron donor compounds used for preparing the titanium-containing solid component a). Preferred electron donor compounds here are organosilicon compounds of the formula (I)

$$R^1{}_n Si(OR^2)_{4-n} \quad (I)$$

where $R^1$ are identical or different and are each a $C_1$–$C_{20}$-alkyl group, a 5- to 7-membered cycloalkyl group which may in turn bear $C_1$–$C_{10}$-alkyl radicals as substituents, a $C_6$–$C_{18}$-aryl group or a $C_6$–$C_{18}$-aryl-$C_1$–$C_{10}$-alkyl group, $R^2$ are identical or different and are each a $C_1$–$C_{20}$-alkyl groups and n is 1, 2 or 3. Particular preference is given to using compounds in which $R^1$ is a $C_1$–$C_8$-alkyl group or a 5- to 7-membered cycloalkyl group and $R^2$ is a $C_1$–$C_4$-alkyl group and n is 1 or 2.

Among these compounds, particular mention may be made of dimethoxydiisopropylsilane, dimethoxyisobutylisopropylsilane, dimethoxydiisobutylsilane, dimethoxydicyclopentylsilane, dimethoxyisopropyl-tert-butylsilane, dimethoxyisobutyl-sec-butylsilane and dimethoxyisopropyl-sec-butylsilane.

The cocatalysts b) and c) are preferably used in such amounts that the atomic ratio of aluminum from the aluminum compound b) to titanium from the titanium-containing solid component a) is from 10:1 to 800:1, in particular from 20:1 to 200:1, and the molar ratio of the aluminum compound b) to the electron donor compound c) is from 1:1 to 250:1, in particular from 10:1 to 80:1.

The titanium-containing solid component a) and the cocatalysts, viz. the aluminum compound b) and the electron donor compound c) which is normally used together form the Ziegler-Natta catalyst system.

The method of the present invention can also be employed for introducing catalyst systems based on metallocene compounds or polymerization-active metal complexes into the polymerization reactor.

For the purposes of the present invention, metallocenes are complexes of metals of transition groups of the Periodic Table with organic ligands, which together with compounds capable of forming metallocenium ions give effective catalyst systems. When using the method of the present invention, the metallocene complexes are generally present in the catalyst system in supported form. Supports used are frequently inorganic oxides. Preference is given to the above-described inorganic oxides which are also used for preparing the titanium-containing solid component a).

Metallocenes which are usually used contain titanium, zirconium or hafnium as central atom, with zirconium being preferred. In general, the central atom is bound via a π bond to at least one, usually substituted, cyclopentadienyl group and to further substituents. The further substituents can be halogens, hydrogen or organic radicals, with preference being given to fluorine, chlorine, bromine or iodine or a $C_1$–$C_{10}$-alkyl group.

Preferred metallocenes contain central atoms which are bound via two π bonds to two substituted cyclopentadienyl groups, and particular preference is given to those in which substituents of the cyclopentadienyl groups are bound to both cyclopentadienyl groups. Very particular preference is given to complexes whose cyclopentadienyl groups are additionally substituted by cyclic groups on two adjacent carbon atoms.

Preferred metallocenes also include those which contain only one cyclopentadienyl group which is, however, substituted by a radical which is also bound to the central atom.

Examples of suitable metallocene compounds are
ethylenebis(indenyl)zirconium dichloride,
ethylenebis(tetrahydroindenyl)zirconium dichloride,
diphenylmethylene-9-fluorenylcyclopentadienylzirconium dichloride,
dimethylsilanediylbis(3-tert-butyl-5-methylcyclopentadiehyl) zirconium dichloride,
dimethylsilanediylbis(2-methylindenyl)zirconium dichloride,
dimethylsilanediylbis(2-methylbenzindenyl)zirconium dichloride,
dimethylsilanediylbis(2-methyl-4-phenylindenyl) zirconiumdichloride,
dimethylsilanediylbis(2-methyl-4-naphthylindenyl) zirconium dichloride,
dimethylsilanediylbis(2-methyl-4-isopropylindenyl) zirconium dichloride or
dimethylsilanediylbis(2-methyl-4,6-diisopropylindenyl) zirconium dichloride and also the corresponding dimethylzirconium compounds.

The metallocene compounds are either known or are obtainable by methods known per se.

The metallocene catalyst systems further comprise compounds capable of forming metallocenium ions as cocatalysts. Suitable cocatalysts are strong, uncharged Lewis acids, ionic compounds having Lewis-acid cations or ionic compounds having Brönsted acids as cation. Examples are tris(pentafluorophenyl)borane, tetrakis(pentafluorophenyl) borate or salts of N,N-dimethyl-anilinium. Further compounds which are capable of forming metallocenium ions and are thus suitable as cocatalysts are open-chain or cyclic aluminoxane compounds. These are usually prepared by reaction of a trialkylaluminum with water and are generally in the form of mixtures of both linear and cyclic chain molecules of various lengths.

In addition, the metallocene catalyst systems may comprise organometallic compounds of metals of main groups I, II or III of the Periodic Table, e.g. n-butyllithium, n-butyl-n-octylmagnesium or triisobutylaluminum, triethylaluminum or trimethylaluminum.

The method of the present invention can be employed for the addition of catalysts which are used in the polymerization of $C_2$–$C_{20}$-olefins. This polymerization can be carried out in at least one reaction zone, frequently in two or more reaction zones connected in series (reactor cascade), in the gas phase, in the liquid phase, in a slurry or else in bulk. The reaction conditions in the actual polymerization can also be chosen so that the respective monomers are present in two different phases, for example partly in the liquid state and partly in the gaseous state (condensed mode).

It is possible to use the customary reactors used for the polymerization of $C_2$–$C_{20}$-olefins. Suitable reactors are, inter alia, continuously operated horizontal or vertical stirred vessels, circulation reactors, loop reactors, multistage reactors or fluidized-bed reactors. The size of the reactors is of no great importance as far as the method of the present invention is concerned. The size depends on the effort which is to be achieved in the reaction zone or in the individual reaction zones.

Reactors used are particularly preferably fluidized-bed reactors and horizontally or vertically stirred powder bed reactors. The reaction bed generally comprises, for the purposes of the present invention, the polymer of $C_2$–$C_{20}$-olefins which is polymerized in the reactor in question.

In a particularly preferred embodiment of the method of the present invention, the polymerization is carried out in a reactor or in a cascade of reactors connected in series in which the pulverulent reaction bed is kept in motion by means of a vertical stirrer. In this case, free-standing helical stirrers are particularly well suited. Such stirrers are known, for example, from EP-B 000 512 and EP-B 031 417. These stirrers distribute the pulverulent reaction bed very homogeneously. Examples of such pulverulent reaction beds are described in EP-B 038 478. The reactor cascade preferably comprises two tank-shaped reactors which are connected in series, are each provided with a stirrer and each have a capacity of from 0.1 to 100 m³, for example 12.5, 25, 50 or 75 m³.

In the novel method of adding catalysts for the polymerization of $C_2$–$C_{20}$-olefins, the catalyst, i.e. the titanium-containing solid component a) in the case of Ziegler-Natta catalysts or the metallocene compound in the case of metallocene catalysts, is firstly introduced into the container A. The latter can be any storage container customary in industry, e.g. a stirred vessel or a vessel without a stirrer.

According to the method of the present invention, the cocatalysts used, i.e. the organic aluminum compounds b) and the electron donor compounds c) in the case of Ziegler-Natta catalyst systems or the compounds capable of forming metallocenium ions in the case of metallocene catalyst systems, are subsequently mixed with an inert solvent in a container B. The container B is likewise a storage container customary in industry, for example a stirred vessel or a vessel without a stirrer. Mixing of the cocatalysts used with the inert solvent is usually carried out at from 10 to 50° C., in particular at from 15 to 40° C., for a period of from 2 to 120 minutes, in particular from 3 to 100 minutes. Suitable inert solvents are, for example, petroleum fractions such as Exxol or Varsol, both commercial products of Exxon, or else other inert hydrocarbons. Particularly useful inert hydrocarbons are, for example, pentane, hexane, heptane, nonane and decane and also petroleum fractions comprising hydrocarbons having a boiling range from 80 to 120° C. or from 140 to 170° C.

In the novel method of adding catalysts, it is important that the contents of the container B (including the cocatalysts) are introduced into the container A in which the catalyst is present and are mixed with the catalyst there. This is usually carried out at from 10 to 50° C., in particular from 15 to 35° C., for a period of from 2 to 120 minutes, in particular from 3 to 100 minutes. From there, the contents of the container A, i.e. the catalyst, the cocatalysts and the inert solvent, are then introduced into the actual polymerization reactor. This is usually carried out by pumping or by applying a pressure gradient. The actual polymerization of the $C_2$–$C_{20}$-olefins then takes place in the polymerization reactor.

The actual polymerization can be carried out under customary reaction conditions at from 40 to 150° C. and pressures of from 1 to 100 bar. Preference is given to temperatures of from 40 to 120° C., in particular from 60 to 100° C., and pressures of from 10 to 50 bar, in particular from 20 to 40 bar. The molar mass of the $C_2$–$C_{20}$-olefin polymers formed can be controlled and set by addition of regulators customary in polymerization technology, for example hydrogen. Apart from molar mass regulators, it is also possible to use catalyst activity regulators, i.e. compounds which influence the catalyst activity, or antistatics. The latter prevent deposit formation on the reactor wall as a result of electrostatic charging. The polymers of the $C_2$–$C_{20}$-olefins generally have a melt flow rate (MFR) of from 0.05 to 3000 g/10 min, in particular from 0.1 to 100 g/10 min, at 230° C. under a weight of 2.16 kg. The melt flow rate corresponds to the amount of polymer which is pressed out over a period of 10 minutes from a test apparatus standardized in accordance with ISO 1133 at 230° C. under a weight of 2.16 kg. Particular preference is given to polymers whose melt flow rate is from 0.2 to 50 g/10 min at 230° C. under a weight of 2.16 kg.

The mean residence times in the actual polymerization of the $C_2$–$C_{20}$-olefins are in the range from 0.1 to 10 hours, preferably in the range from 0.2 to 5 hours and in particular in the range from 0.3 to 4 hours.

The novel method of adding catalysts makes it possible for them to be fed reliably and homogeneously into the polymerization reactor where they can then display an increased productivity. The method of the present invention is technically simple and inexpensive to apply.

EXAMPLES

In the experiments of Examples 1 and 2 and the Comparative Examples A, B and C, use was made of a Ziegler-Natta catalyst system comprising a titanium-containing solid component a) prepared by the following method.

In a first stage, a finely divided silica gel having a mean particle diameter of 30 μm, a pore volume of 1.5 cm³/g and a specific surface area of 260 m²/g was admixed with a solution of n-butyloctylmagnesium in n-heptane, using 0.3 mol of the magnesium compound per mol of $SiO_2$. The finely divided silica gel additionally had a mean particle size of the primary particles of 3–5 μm and voids and channels having a diameter of 3–5 μm, with the macroscopic proportion by volume of the voids and channels in the total particle being about 15%. The mixture was stirred for 45 minutes at 95° C., then cooled to 25° C., after which an amount of hydrogen chloride corresponding to 10 times the molar amount of the organomagnesium compound was passed into it. After 60 minutes, the reaction product was admixed with 3 mol of ethanol per mol of magnesium while stirring continually. This mixture was stirred at 80° C. for 30 minutes and subsequently admixed with 7.2 mol of titanium tetrachloride and 0.5 mol of di-n-butyl phthalate, in each case based on 1 mol of magnesium. The mixture was subsequently stirred at 100° C. for 1 hour, the solid obtained in this way was filtered off and washed a number of times with ethylbenzene.

The solid product obtained was extracted for 3 hours at 125° C. with a 10% strength by volume solution of titanium tetrachloride in ethylbenzene. The solid product was then separated from the extractant by filtration and washed with n-heptane until the washings contained only 0.3% by weight of titanium tetrachloride.

The titanium-containing solid component a) comprised
3.5% by weight of Ti
7.4% by weight of Mg
28.2% by weight of Cl.

In addition to the titanium-containing solid component a), triethylaluminum and organic silane compounds were used as cocatalysts in a manner analogous to the teachings of U.S. Pat. No. 4,857,613 and U.S. Pat. No. 5,288,824.

Example 1

2000 g of the titanium-containing solid component a) (PTK4 catalyst) were introduced into a stainless steel container A having a volume of 700 liters.

500 liters of a petroleum fraction, viz. Varsol 140/170 (trade name of Exxon Chemicals), were placed in a second container B, which had been blanketed with nitrogen, at 30° C., and 15 mol of triethylaluminum and 0.15 mol of isobutylisopropyldimethoxysilane were subsequently added separately. This mixture was stirred for 5 minutes and subsequently transferred into the container A. The contents of the container A then consisted of: 2000 g of titanium-containing solid component, 500 liters of Varsol 140/170, 15 mol of triethylaluminum and 0.15 mol of isobutylisopropyldimethoxysilane (=donor). These contents were stirred at 40° C. for 10 minutes.

20,000 l of Varsol in which 50 mol of triethylaluminum and 1000 kg of propylene had been dissolved were placed in a large reactor having a volume of 40,000 l. This solution was stirred for ten minutes.

The entire contents of the container A were transferred into the polymerization reactor C. At the same time, propylene was fed in until a pressure of 10 bar had been established, and the temperature was then increased to 70° C. Hydrogen was added in such an amount that its concentration in the gas phase was 0.8% by volume. The polymerization started. The pressure was kept constant at 10 bar by introduction of further propylene. The temperature was kept constant by cooling. A total of 10,000 kg of propylene were fed in over a period of 2 hours.

The reactor was subsequently depressurized, and Varsol and the polypropylene obtained were separated by filtration and centrifugation. The polypropylene was dried.

An MFR 230/5 of 8 g/10 min and a proportion of material soluble in cold xylene of 1.6% by weight were determined on the polypropylene obtained. The catalyst productivity was calculated as 5.9 kg of PP/g of cat. A residual ash content of 1% was determined.

Comparative Example A

The procedure of Example 1 was repeated, except that only Varsol was placed in the container B. Triethylaluminum and donor were introduced directly into the reactor C in the amounts indicated in Example 1. No polymerization was observed in the reactor C.

Comparative Example B

The procedure of Example 1 was repeated, except that Varsol and the amount of donor specified in Example 1 were placed in the container B.

Triethylaluminum was introduced directly into the reactor C in the amount indicated in Example 1. No polymerization was observed in the reactor C.

Comparative Example C

The procedure of Example 1 was repeated, except that Varsol and the amount of triethylaluminum specified in Example 1 were placed in the container B. An MFR 230/5 of 11 g/10 min and a proportion of material soluble in cold xylene of 5.6% by weight were determined on the polypropylene obtained. The catalyst productivity was calculated as 2.5 kg of PP/g of cat.

Example 2

1700 g of the titanium-containing solid component a) (PTK4 catalyst) were introduced into a stainless steel container having a volume of 1000 liters. 500 liters of Varsol 140/170 were placed in a second container B, which had been blanketed with nitrogen, at 30° C., and 1.5 mol of triethylaluminum and 0.15 mol of isobutylisopropyldimethoxysilane were subsequently added separately. This mixture was stirred for 5 minutes and subsequently transferred into the container A. The contents of the container A then consisted of: 1700 g of titanium-containing solid component a), 500 l of Varsol 140/170, 1.5 mol of triethylaluminum and 0.15 mol of isobutylisopropyldimethoxysilane (=donor). These contents were stirred at 30° C. for 10 minutes.

20,000 l of Varsol in which 60 mol of triethylaluminum and 1000 kg of propylene had been dissolved were placed in a large reactor having a volume of 40,000 l. This solution was stirred for ten minutes.

The entire contents of the container A were transferred into the polymerization reactor C. At the same time, propylene was fed in until a pressure of 10 bar had been established, and the temperature was then increased to 70° C. Hydrogen was added in such an amount that its concentration was 0.8% by volume. The polymerization started. The pressure was kept constant at 10 bar by introduction of further propylene. The temperature was kept constant by cooling. A total of 10,000 kg of propylene were fed in over a period of 2 hours. After two hours, the reactor was depressurized to 1 bar and 500 kg of ethylene were slowly fed in over a period of 12 minutes. The composition of the gas phase above the liquid phase in the reactor was monitored by gas chromatography.

The reactor was subsequently depressurized and Varsol and the propylene-ethylene copolymer obtained were separated by filtration and centrifugation. The propylene-ethylene copolymer obtained was dried.

An MFR 230/5 of 12 g/10 min and a proportion of material soluble in cold xylene of 10.4% by weight are determined on the propylene-ethylene copolymer. The catalyst productivity is calculated as 7.9 kg of PP/g of cat.

Determination of the melt flow rate (MFR): in accordance with ISO 1133, at 230° C. under 2.16 kg.

Determination of the proportion of material soluble in cold xylene (in % by weight): a polymer sample was dissolved completely in boiling xylene and the mixture was then cooled to 20° C. Insoluble material was filtered off, dried to constant weight and weighed. The ratio of the amount of polymer weighed to the amount of polymer used was calculated as a percentage.

Determination of the catalyst productivity (in kg of PP/g of cat.): via the ratio of the amount of polypropylene (PP) produced in kg to the amount of catalyst used in g.

We claim:

1. A method of adding Ziegler-Natta catalyst systems to a reactor for the polymerization of $C_2$–$C_{20}$-olefins, wherein the catalyst used is a titanium-containing solid component a) and as cocatalysts organic aluminum compounds b) and the electron donor compounds c), in which a solvent-free titanium-containing solid component a) is introduced into a liquid-free container A, the cocatalysts are mixed with an inert solvent in a container B, the contents of the container B are introduced into the container A after the solvent-free titanium-containing solid component a) has been introduced into container A and thereafter mixed with the catalyst and thereafter introduced into the reactor.

2. A method as claimed in claim 1, wherein the cocatalysts used are mixed at from 10 to 50° C. in the container B.

3. A method as claimed in claim 1, wherein the contents of the container B are introduced into the container A at from 10 to 50° C. and are mixed with the catalyst there.

4. A method as claimed in claim 1, wherein the inert solvent used in container B is an inert hydrocarbon.

5. A method as claimed in claim 1 used for the addition of Ziegler-Natta catalyst systems in the polymerization of ethylene, propylene or 1-butene.

* * * * *

UNITED STATES PATENT AND TRADEMARK OFFICE
CERTIFICATE OF CORRECTION

PATENT NO. : 6,881,801 B2
DATED : April 19, 2005
INVENTOR(S) : Volker Dolle et al.

It is certified that error appears in the above-identified patent and that said Letters Patent is hereby corrected as shown below:

Column 11,
Line 13, delete "the".

Column 12,
Lines 7 and 10, delete "." after "C".

Signed and Sealed this

Eleventh Day of October , 2005

JON W. DUDAS
*Director of the United States Patent and Trademark Office*